(12) United States Patent
Hu et al.

(10) Patent No.: US 11,624,968 B2
(45) Date of Patent: Apr. 11, 2023

(54) OPTICAL ELEMENT DRIVING MECHANISM AND CONTROL METHOD THEREOF

(71) Applicant: TDK TAIWAN CORP., Taoyuan (TW)

(72) Inventors: Chao-Chang Hu, Taoyuan (TW);
Chao-Hsi Wang, Taoyuan (TW);
Chih-Wei Weng, Taoyuan (TW);
Kuen-Wang Tsai, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 344 days.

(21) Appl. No.: 16/800,588

(22) Filed: Feb. 25, 2020

(65) Prior Publication Data

US 2020/0272025 A1    Aug. 27, 2020

Related U.S. Application Data

(60) Provisional application No. 62/809,891, filed on Feb. 25, 2019.

(30) Foreign Application Priority Data

Feb. 3, 2020    (CN) .......................... 202020150659.6

(51) Int. Cl.
    G03B 5/00    (2021.01)
    G02B 7/04    (2021.01)

(52) U.S. Cl.
    CPC ................. G03B 5/00 (2013.01); G02B 7/04 (2013.01); *G03B 2205/0069* (2013.01)

(58) Field of Classification Search
    CPC ........ H02K 41/03; H02K 41/031; G03B 5/00; G03B 2205/0069; G02B 7/04
    See application file for complete search history.

(56) References Cited

U.S. PATENT DOCUMENTS

| | | | |
|---|---|---|---|
| 2019/0372447 A1* | 12/2019 | Weber | B65G 54/02 |
| 2020/0036276 A1* | 1/2020 | Huber | H02P 25/06 |
| 2020/0153315 A1* | 5/2020 | Grosskreuz | B65G 54/02 |
| 2021/0253374 A1* | 8/2021 | Elsperger | B65G 54/025 |

* cited by examiner

*Primary Examiner* — Clayton E. LaBalle
*Assistant Examiner* — Diana Hancock
(74) *Attorney, Agent, or Firm* — Muncy, Geissler, Olds & Lowe, P.C.

(57) ABSTRACT

A control method of an optical element driving mechanism includes: providing a first coil group to a fixed assembly, wherein the first coil group includes a plurality of first coils; providing a magnetic element to be connected to a movable assembly; and controlling at least one first coil of the first coil group by a control circuit at least according to position information of the movable assembly relative to the fixed assembly to act with the magnetic element to generate an electromagnetic driving force, thereby driving the movable assembly to move relative to the fixed assembly in a first direction toward a target position.

22 Claims, 7 Drawing Sheets

OPTICAL ELEMENT DRIVING MECHANISM AND CONTROL METHOD THEREOF

CROSS REFERENCE TO RELATED APPLICATIONS

This application claims the benefit of U.S. Provisional Application No. 62/809,891, filed Feb. 25, 2019, and China Patent Application No. 202020150659.6, filed Feb. 3, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism having a linear motor.

Desription of Related Art

As technology has developed, many of today's electronic devices (such as smartphones) have still-camera or video-camera functionality. Using camera modules disposed on electronic devices, users can operate their electronic devices to capture photographs and record videos.

The design trend in today's electronic devices is toward miniaturization, meaning that the various components of a camera module and its structure must also be continuously reduced in size, so as to aid in miniaturization. In general, a driving mechanism in a camera module has a camera lens holder that is configured to hold a camera lens, and the driving mechanism can have the functions of auto focusing or optical image stabilization. However, although existing driving mechanisms can perform the aforementioned functions of photographing and video recording, they still cannot meet all the needs of miniaturization.

Therefore, how to design a camera module that has stronger driving capability and reduce the thickness of electronic devices is a topic nowadays that needs to be discussed and solved.

BRIEF SUMMARY OF THE DISCLOSURE

Accordingly, one objective of the present disclosure is to provide an optical element driving mechanism to solve the above problems.

According to some embodiments of the disclosure, a control method of an optical element driving mechanism is provided and includes: providing a first coil group to a fixed assembly, wherein the first coil group includes a plurality of first coils; providing a magnetic element to be connected to a movable assembly; and controlling at least one first coil of the first coil group by a control circuit at least according to position information of the movable assembly relative to the fixed assembly to act with the magnetic element to generate an electromagnetic driving force, thereby driving the movable assembly to move relative to the fixed assembly in a first direction toward a target position.

According to some embodiments, the control method of the optical element driving mechanism further includes: when the magnetic element is located in an initial position, the control circuit outputs a first control current to the first of the first coils so as to drive the magnetic element and the movable assembly to move in the first direction relative to the fixed assembly toward the target position, wherein when viewed in the second direction and the magnetic element is in the initial position, the first of the first coils completely overlaps the magnetic element.

According to some embodiments, the control method of the optical element driving mechanism further includes: when the magnetic element moves from the initial position to a first position, a second one of the first coils generates an induced current to the control circuit, wherein when viewed in a second direction, a first segment of the second one of the first coils overlaps the magnetic element; and the control circuit outputs a second control current to the second one of the first coils according to the induced current, wherein a phase difference between the first control current and the second control current is 180 degrees.

According to some embodiments, the control method of the optical element driving mechanism further includes: when the magnetic element is located in the first position, the control circuit stops supplying the first control current to the first one of the first coils or switches the first control current provided to the first one of the first coils to the second control current.

According to some embodiments, the control method of the optical element driving mechanism further includes: when the magnetic element moves from the first position to a second position, the control circuit switches the second control current supplied to the second one of the first coils to the first control current, wherein when the magnetic element is located in the second position, a second segment of the second one of the first coils overlaps the magnetic element.

According to some embodiments, the control method of the optical element driving mechanism further includes: when the magnetic element moves from the first position to the second position, the control circuit stops outputting the second control current to the first one of the first coils.

According to some embodiments, the control method of the optical element driving mechanism further includes: when the control circuit determines that the magnetic element exceeds the target position in the first direction according to the position information, the control circuit outputs a reverse driving current to one of the first coils which is adjacent to the magnetic element so as to drive the magnetic element to move in a third direction, wherein the third direction is opposite to the first direction.

According to some embodiments, the control method of the optical element driving mechanism further includes: when the control circuit determines that the magnetic element is close to the target position according to the position information, the control circuit outputs a third control current to one of the first coils adjacent to the magnetic element, so that the magnetic element maintains a stable state.

According to some embodiments, the control method of the optical element driving mechanism further includes: the control circuit outputs a correction current to the first coil group to drive the magnetic element to return to an initial position.

According to some embodiments, the control method of the optical element driving mechanism further includes: the control circuit controls at least one first coil in the first coil group according to an image data.

According to some embodiments of the disclosure, a control method of an optical element driving mechanism includes: providing a first coil group to a fixed assembly, wherein the first coil group includes a plurality of first coils; providing a second coil group to the fixed assembly, wherein the second coil group includes a plurality of second coils; providing a magnetic element to a movable assembly; and controlling at least one first coil of the first coil group and/or at least one second coil of the second coil group by a control circuit at least according to position information of the movable assembly relative to the fixed assembly, so that the at least one first coil and/or the at least one second coil acts with the magnetic element to generate an electromagnetic driving force, thereby driving the movable assembly to move relative to the fixed assembly in a first direction toward a target position.

According to some embodiments, the control method of the optical element driving mechanism further includes: when the magnetic element is located in an initial position, the control circuit outputs a first control current to a first one of the first coils to drive the magnetic element and the movable assembly to move relative to the fixed assembly in the first direction toward the target position, wherein when viewed in a second direction, the first one of the first coils completely overlaps the magnetic element.

According to some embodiments, the control method of the optical element driving mechanism further includes: when the magnetic element is located in the initial position, a first one of the second coils generates a second induced current to the control circuit, wherein when viewed in the second direction, a first segment of the first one of the second coils overlaps the magnetic element; and the control circuit outputs a second control current to the first one of the second coils according to the second induced current, wherein a phase difference between the first control current and the second control current is 180 degrees.

According to some embodiments, the control method of the optical element driving mechanism further includes: when the magnetic element moves from the initial position to a first position, a second one of the first coils generates a first induced current to the control circuit, and a first segment of the second one of the first coils overlaps the magnetic element; and the control circuit outputs the second control current to the second one of the first coils according to the first induced current.

According to some embodiments, the control method of the optical element driving mechanism further includes: when the magnetic element is located in the first position, the control circuit stops supplying the first control current to the first one of the first coils or switches the first control current provided to the first one of the first coils to the second control current.

According to some embodiments, the control method of the optical element driving mechanism further includes: when the magnetic element is located in the first position, the control circuit switches the second control current provided to the first one of the second coils to the first control current.

According to some embodiments, the control method of the optical element driving mechanism further includes: when the magnetic element moves from the first position to a second position, the control circuit switches the second control current supplied to the second one of the first coils to the first control current, wherein when the magnetic element is located in the second position, a second segment of the second one of the first coils overlaps the magnetic element.

According to some embodiments, the control method of the optical element driving mechanism further includes: when the magnetic element moves from the first position to the second position, the control circuit stops outputting the second control current to the first one of the first coils.

According to some embodiments, the control method of the optical element driving mechanism further includes: when the magnetic element moves from the first position to the second position, the control circuit outputs the second control current to a second one of the second coils, wherein when the magnetic element is located in the second position, a first segment of the second one of the second coils overlaps the magnetic element.

According to some embodiments, the control method of the optical element driving mechanism further includes: when the magnetic element moves from the first position to the second position, the control circuit stops supplying the first control current to the first one of the second coils or switches the first control current provided to the first one of the second coils to the second control current.

According to some embodiments, the control method of the optical element driving mechanism further includes: when the control circuit determines that the magnetic element exceeds the target position in the first direction according to the position information, the control circuit outputs a reverse driving current to one of the first coils that is adjacent to the magnetic element and/or one of the second coils which is that is adjacent to the magnetic element so as to drive the magnetic element to move in a third direction, wherein the third direction is opposite to the first direction.

According to some embodiments, the control method of the optical element driving mechanism further includes: when the control circuit determines that the magnetic element is close to the target position according to the position information, the control circuit outputs a third control current to one of the first coils adjacent to the magnetic element and/or one of the second coils adjacent to the magnetic element, so that the magnetic element maintains a stable state.

According to some embodiments of the disclosure, an optical element driving mechanism includes a fixed assembly, a movable assembly, a driving assembly, and a control circuit. The movable assembly is movable relative to the fixed assembly. The driving assembly is configured to drive the movable assembly to move relative to the fixed assembly, wherein the driving assembly includes a first coil group, having a plurality of first coils, wherein each of the first coils includes a first segment and a second segment which are parallel to each other and are perpendicular to the first direction; and a magnetic element, connected to the movable assembly. The control circuit is electrically connected to the first coils. A maximum size of the magnetic element is greater than or equal to a shortest distance between the first segment and the second segment in the first direction.

The present disclosure provides an optical element driving mechanism configured to drive the movable assembly (for example, a camera lens) for performing the auto-focus function. In an embodiment of the present disclosure, the optical element driving mechanism may include a first coil group, a second coil group, a magnetic element, and a control circuit. The control circuit can provide the positive current and/or the negative current to the coils in the first coil group and the second coil group according to the position information of the magnetic element to generate the electromagnetic driving force to drive the magnetic element to move. Because the coils in the first coil group and the second coil group are turned on in sequence according to the positive current or the negative current, it can ensure that the magnetic element moves smoothly in the first direction, and the range of motion of the movable assembly can be increased.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
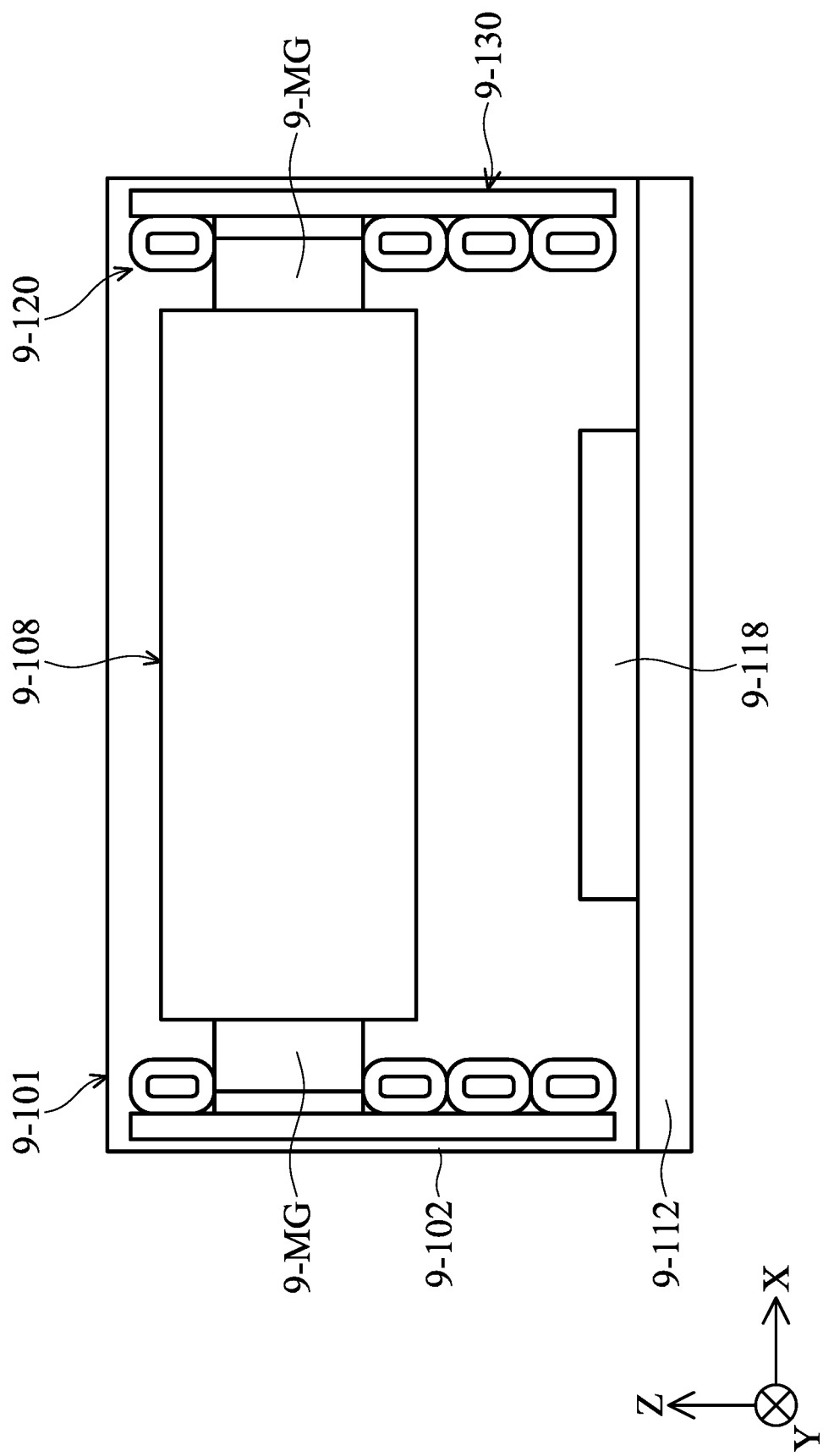
FIG. 1 is a schematic diagram of an optical element driving mechanism 9-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, the directional terms are used for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is a schematic diagram of an optical element driving mechanism 9-100 according to an embodiment of the present disclosure. In this embodiment, the optical element driving mechanism 9-100 can be an optical camera module, which can be installed in various electronic devices or portable electronic devices, such as a smart phone, for allowing users to perform image capture function. In this embodiment, the optical element driving mechanism 9-100 may be a voice coil motor (VCM) with an autofocus (AF) function, but this disclosure is not limited thereto. In other embodiments, the optical element driving mechanism 9-100 may also have functions of automatic focus (AF) and optical image stabilization (OIS). In addition, the optical element driving mechanism 9-100 can be a periscope camera module.

As shown in FIG. 1, the optical element driving mechanism 9-100 includes a fixed assembly 9-101, a movable assembly 9-108, a driving assembly 9-120, and a circuit assembly 9-130. The fixed assembly 9-101 may include a casing 9-102 and a base 9-112. The movable assembly 9-108 is disposed in the fixed assembly 9-101 and configured to hold and drive an optical element (not shown in the figures), for example a camera lens. The circuit assembly 9-130 can be fixed to the fixed assembly 9-101 and can be electrically connected to the driving assembly 9-120, and the driving assembly 9-120 is configured to drive the movable assembly 9-108 to move relative to the fixed assembly 9-101, such as moving along the Z-axis (the first direction). A photosensitive element 9-118 can be disposed on the base 9-112, and the external light may arrive at the photosensitive element 9-118 after traveling through the optical element held by the movable assembly 9-108 so as to generate a digital image. The driving assembly 9-120 and the circuit assembly 9-130 may constitute a linear motor, but they are not limited to this embodiment.

Figure 2:
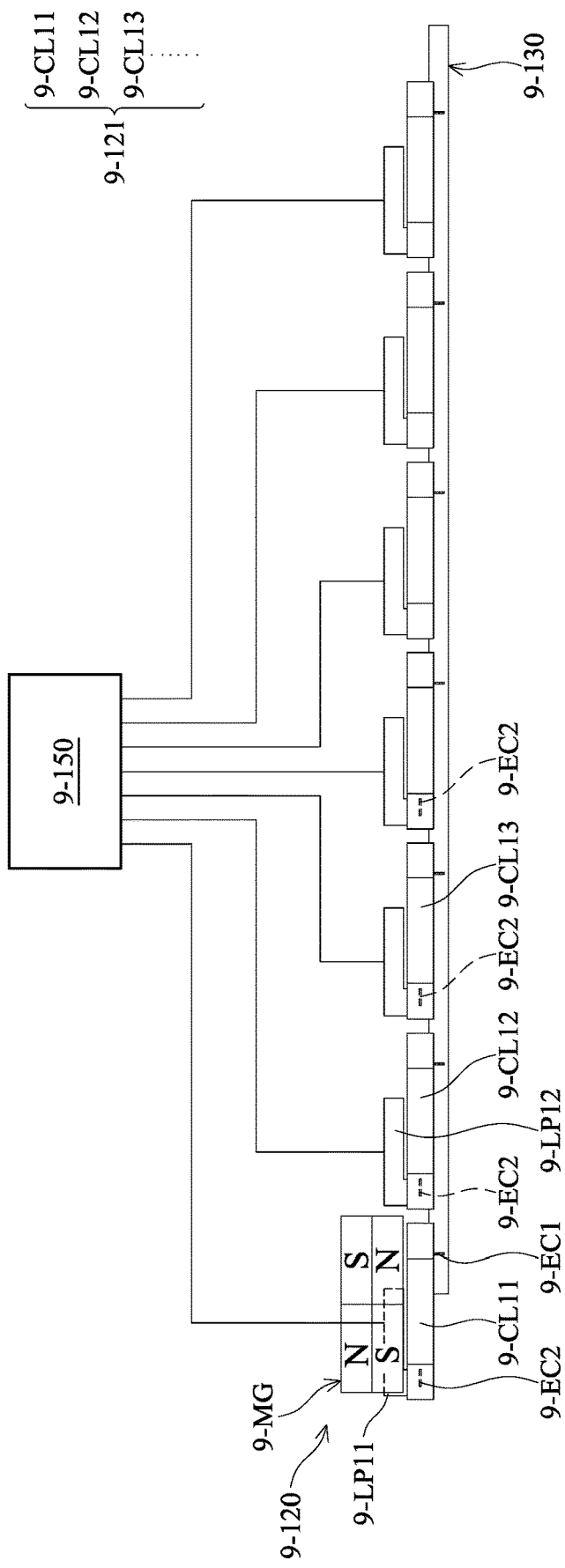
FIG. 2 is a top view of a driving assembly 9-120 and a circuit assembly 9-130 according to an embodiment of the present disclosure.

Please refer to FIG. 2, which is a top view of a driving assembly 9-120 and a circuit assembly 9-130 according to an embodiment of the present disclosure. As shown in FIG. 2, the circuit assembly 9-130 has a long-shaped structure and is configured to be electrically to the ground, and a plurality of L-shaped conductive plates are disposed on one side of the circuit assembly 9-130.

Furthermore, as shown in FIG. 2, the driving assembly 9-120 includes a first coil group 9-121 and a magnetic element 9-MG. The first coil group 9-121 has a plurality of first coils (the first coils 9-CL11, 9-CL12, 9-CL13, and so on), and the first coils are arranged along the Z-axis (the first direction).

As shown in FIG. 2, the plurality of first coils correspond to the L-shaped conductive plates, respectively. For example, the first coil 9-CL11 corresponds to the L-shaped conductive plate 9-LP11, and so on. For example, the L-shaped conductive plate 9-LP12 corresponds to the first coil 9-CL12.

It should be noted that each first coil has a first electrical connection portion 9-EC1 and a second electrical connection portion 9-EC2. The first electrical connection portion 9-EC1 is electrically connected to the circuit assembly 9-130, and the second electrical connection portion 9-EC2 is electrically connected to the corresponding L-shaped conductive plate and the control circuit 9-150. The control circuit 9-150 can control these first coils individually or collectively, which means that the second electrical connection portions 9-EC2 of the first coils are electrically independent from each other.

Figure 3A:
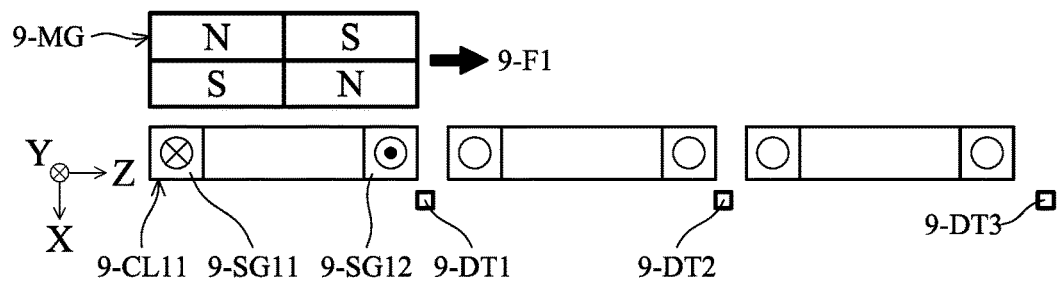
FIG. 3A is a partial structural diagram of the optical element driving mechanism 9-100 according to an embodiment of the present disclosure.

Next, please refer to FIG. 2, FIG. 3A to FIG. 3E. FIG. 3A is a partial structural diagram of the optical element driving mechanism 9-100 according to an embodiment of the present disclosure, and FIG. 3B to FIG. 3E are schematic diagrams illustrating that operation of the magnetic element 9-MG relative to the circuit assembly 9-130 (fixed on the fixed assembly 9-101) according to an embodiment of the present disclosure. For clarity, the circuit assembly 9-130 and the control circuit 9-150 in FIG. 2 are omitted herein.

As shown in FIG. 3A, each first coil may have a first segment 9-SG11 and a second segment 9-SG12, the first segment 9-SG11 and the second segment 9-SG12 extend along the Y-axis and are perpendicular to the first direction (the Z-axis), and the first segment 9-SG11 and the second segment 9-SG12 are parallel to each other. Furthermore, in this embodiment, as shown in FIG. 3A, in the first direction, the maximum size of the magnetic element 9-MG is greater than or equal to the shortest distance between the first segment 9-SG11 and the second segment 9-SG12.

Next, a driving method of the magnetic element 9-MG is described as follows. In this embodiment, the control circuit 9-150 can control at least one first coil of the first coil group 9-121 according to position information of the movable assembly 9-108 relative to the fixed assembly 9-101, and the movable assembly 9-108 is connected to the magnetic element 9-MG, so that the first coil acts with the magnetic element 9-MG to generate an electromagnetic driving force 9-F1, thereby driving the movable assembly 9-108 to move relative to the fixed assembly 9-101 in a first direction toward a target position. In this embodiment, the optical element driving mechanism 9-100 may further include a plurality of sensing elements (such as the sensing elements 9-DT1, 9-DT2, 9-DT3), which are respectively disposed on a side of the first coils for sensing the position of the magnetic element 9-MG and transmitting the position information to the control circuit 9-150.

Specifically, as shown in FIG. 3A, the magnetic element 9-MG is located in an initial position, and the control circuit 9-150 may output a first control current (for example, a positive current) to the first coil 9-CL11 at this time so as to generate the electromagnetic driving force 9-F1 to drive the magnetic element 9-MG to move toward the target position (for example, the position in FIG. 3D) in the first direction. It should be noted that when viewed in a second direction (the X-axis), the first coil 9-CL11 completely overlaps the magnetic element 9-MG in the initial position.

Figure 3B:
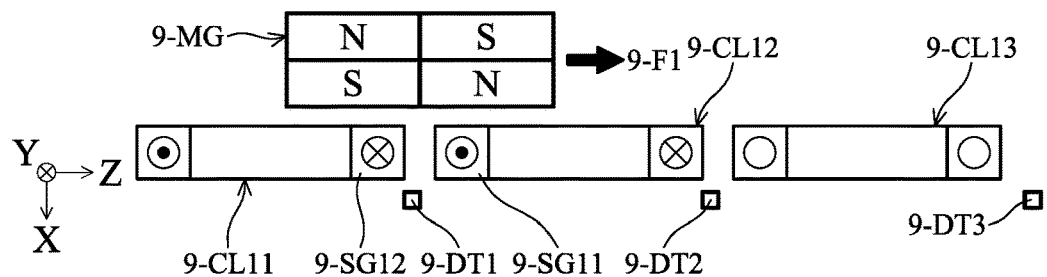
FIG. 3B to FIG. 3E are schematic diagrams illustrating that operation of the magnetic element 9-MG relative to the circuit assembly 9-130 according to an embodiment of the present disclosure.

Next, when the magnetic element 9-MG moves from the initial position in FIG. 3A to a first position in FIG. 3B, the second one of these first coils (the first coil 9-CL12) generates an induced current to the control circuit 9-150 due to the proximity of the magnetic element 9-MG, so that the control circuit 9-150 determines that the magnetic element 9-MG is close to the first coil 9-CL12. At this time, when viewed in the second direction, the first segment 9-SG11 of the first coil 9-CL12 overlaps the N-pole of the magnetic element 9-MG, and the control circuit 9-150 can output a second control current (such as a negative current) to the first coil 9-CL12 according to the induced current or the aforementioned position information so as to generate the electromagnetic driving force 9-F1. The first control current and the second control current may have the same amplitude, and their phase difference is 180 degrees.

Furthermore, when the magnetic element 9-MG is located in the first position, because the second segment 9-SG12 of the first coil 9-CL11 corresponds to the S-pole of the magnetic element 9-MG, the first control current supplied to the first coil 9-CL11 is switched to the second control current by the control circuit 9-150, so that the direction of the electromagnetic driving force 9-F1 generated by the magnetic element 9-MG and the first coil 9-CL11 does not change. It should be noted that the time interval of switching the current by the control circuit 9-150 is sufficiently small so that the magnetic element 9-MG can continue to move smoothly in the first direction.

However, in other embodiments, when the magnetic element 9-MG is located in the first position, the control circuit 9-150 may stop supplying the first control current to the first coil 9-CL11.

Figure 3C:
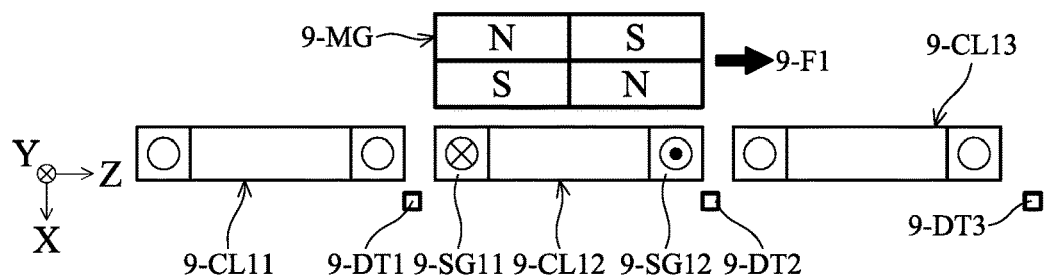

Next, when the magnetic element 9-MG moves from the first position to a second position in FIG. 3C, the control circuit 9-150 switches the second control current supplied to the first coil 9-CL12 to the first control current so that the direction of the generated electromagnetic driving force 9-F1 remains unchanged. As shown in FIG. 3C, when the magnetic element 9-MG is located in the second position, the second segment 9-SG12 of the first coil 9-CL12 overlaps the magnetic element 9-MG.

In addition, when the magnetic element 9-MG moves from the first position to the second position, because the first coil 9-CL11 does not overlap the magnetic element 9-MG, the control circuit 9-150 stops outputting the second control current to the first coil 9-CL11.

Figure 3D:
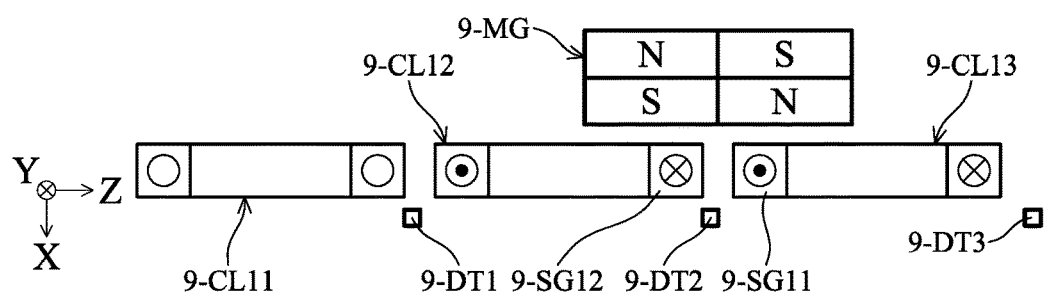
Figure 3E:
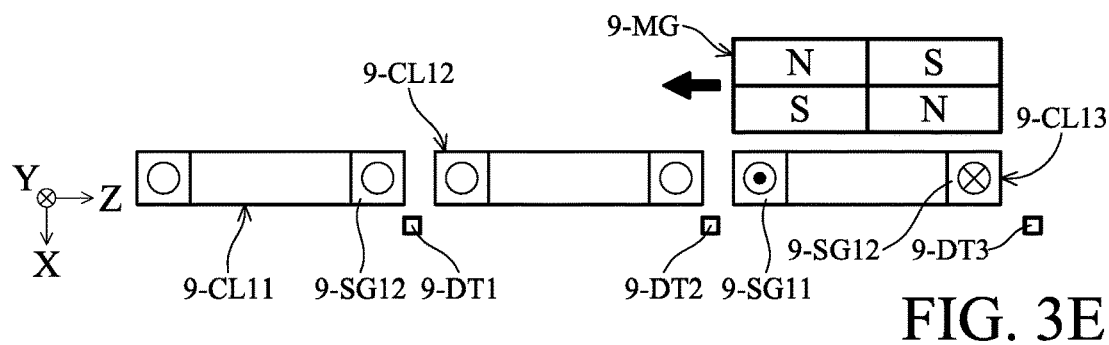

In some embodiments, when the magnetic element 9-MG moves from the initial position in the first direction but exceeds a third position (the target position) in FIG. 3D and reaches a fourth position in FIG. 3E, the control circuit 9-150 can determine that the magnetic element 9-MG exceeds the target position in the first direction according to the position information. At this time, the control circuit 9-150 outputs a reverse driving current to one or more of the first coils which are adjacent to the magnetic element 9-MG. For example, the second control current is outputted to the first coil 9-CL13 to drive the magnetic element 9-MG to move in a third direction (the −Z-axis). In this embodiment, the reverse driving current may include the aforementioned first control current and/or the second control current, and the third direction is opposite to the first direction.

When the magnetic element 9-MG approaches the position in FIG. 3D in the third direction, the control circuit 9-150 can determine that the magnetic element 9-MG is close to the target position according to the position information, and therefore the control circuit 9-150 outputs a third control current to at least one of the first coils adjacent to the magnetic element 9-MG (such as the first coil 9-CL12 and the first coil 9-CL13), so that the magnetic element 9-MG maintains a stable state. In this embodiment, the third control current may be an alternating current, and its frequency is high enough to make the magnetic element 9-MG oscillate or be still on the target position. In this embodiment, the amplitude of the magnetic element 9-MG oscillating at the target position is less than 5% of the maximum stroke of the magnetic element 9-MG.

After the magnetic element 9-MG reaches the target position, the control circuit 9-150 may output a correction current to the first coil group 9-121 so as to drive the magnetic element 9-MG to return to the initial position in the third direction, and the correction current may include the first control current and the second control current. Until the magnetic element 9-MG returns to the initial position, the control circuit 9-150 drives the magnetic element 9-MG to another target position.

In other embodiments of the present disclosure, the control circuit 9-150 may control at least one first coil in the first coil group 9-121 according to image data. The image data may be, for example, a digital image generated by the photosensitive element 9-118. The control circuit 9-150 can output the first, second or third control current according to the average brightness, maximum brightness, average contrast, maximum contrast and so on of the digital image.

Figure 4:
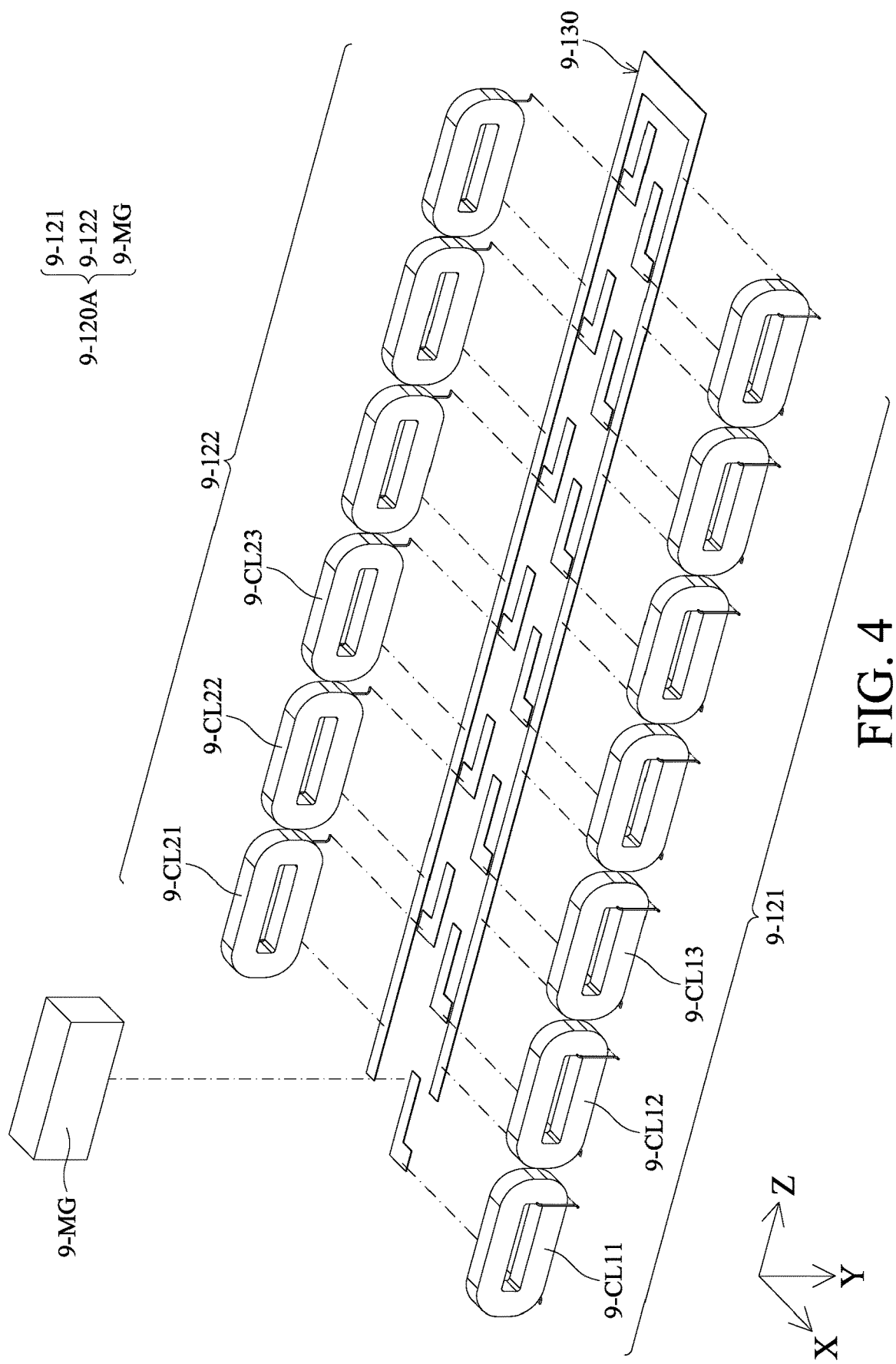
FIG. 4 is an exploded diagram of a driving assembly 9-120A and the circuit assembly 9-130 according to another embodiment of the present disclosure.
Figure 5:
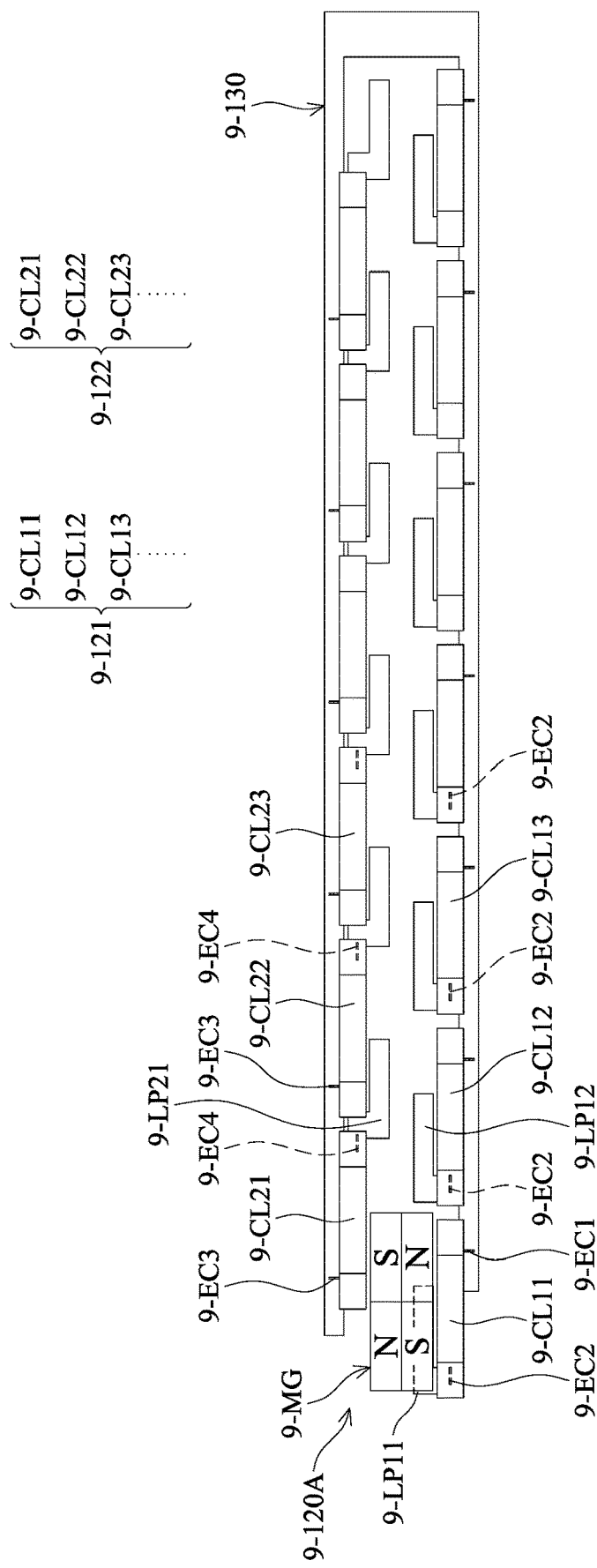
FIG. 5 is a top view of the driving assembly 9-120A and the circuit assembly 9-130 according to another embodiment of the present disclosure.

Please refer to FIG. 4 and FIG. 5. FIG. 4 is an exploded diagram of a driving assembly 9-120A and the circuit assembly 9-130 according to another embodiment of the present disclosure, and FIG. 5 is a top view of the driving assembly 9-120A and the circuit assembly 9-130 according to another embodiment of the present disclosure. Compared to the previous embodiment, as shown in FIG. 4, in addition to the first coil group 9-121, the driving assembly 9-120 of this embodiment further includes a second coil group 9-122. The second coil group 9-122 has a plurality of second coils (the second coils 9-CL21, 9-CL22, 9-CL23, and so on), which are arranged along the Z-axis (the first direction). Furthermore, in this embodiment, the circuit assembly 9-130 may have a U-shaped structure.

As shown in FIG. 5, the plurality of second coils respectively correspond to adjacent L-shaped conductive plates. For example, the second coil 9-CL21 corresponds to the L-shaped conductive plate 9-LP21, and so on. Furthermore, each second coil has a third electrical connection portion 9-EC3 and a fourth electrical connection portion 9-EC4. The third electrical connection portion 9-EC3 is an electrical connected to the circuit assembly 9-130, and the fourth electrical connection portion 9-EC4 is electrically connected to the corresponding L-shaped conductive plate and the control circuit 9-150. The control circuits 9-150 can control these second coils individually or collectively, which means that the fourth electrical connection portions 9-EC4 of the second coils are electrically independent from each other.

Figure 6A:
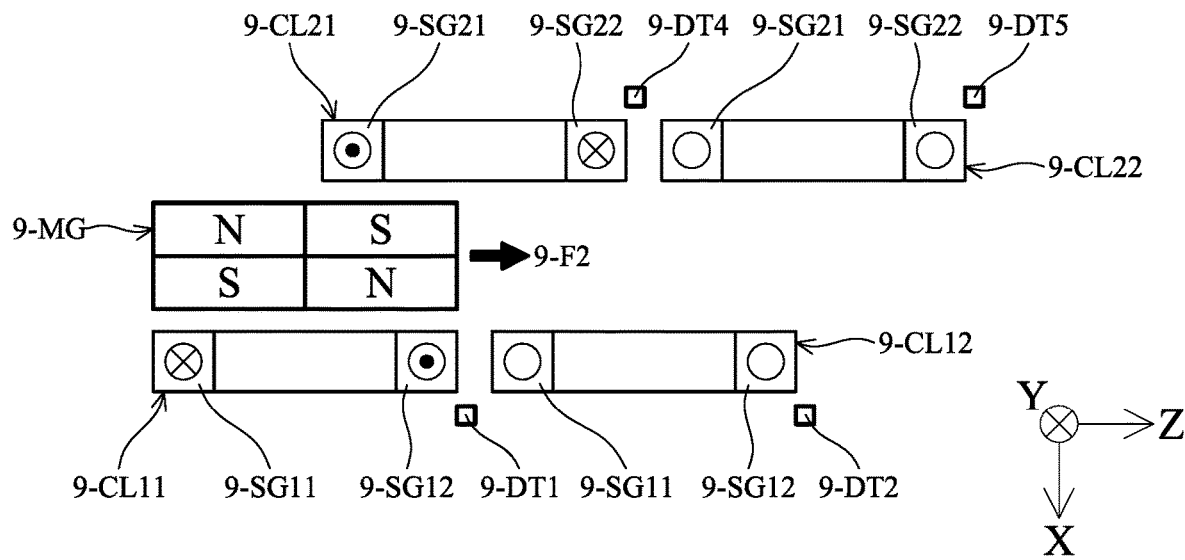
FIG. 6A to FIG. 6D are schematic diagrams illustrating that operation of the magnetic element 9-MG relative to the fixed assembly 9-101 according to another embodiment of the present disclosure.

Next, please refer to FIG. 5 and FIG. 6A to FIG. 6D. FIG. 6A to FIG. 6D are schematic diagrams illustrating that operation of the magnetic element 9-MG relative to the fixed assembly 9-101 according to another embodiment of the present disclosure. As shown in FIG. 6A, similar to the foregoing embodiment, each second coil may have a first segment 9-SG21 and a second segment 9-SG22, and in the first direction, the maximum size of the magnetic element 9-MG is greater than or equal to the shortest distance between the first segment 9-SG21 and the second segment 9-SG22.

Figure 6B:
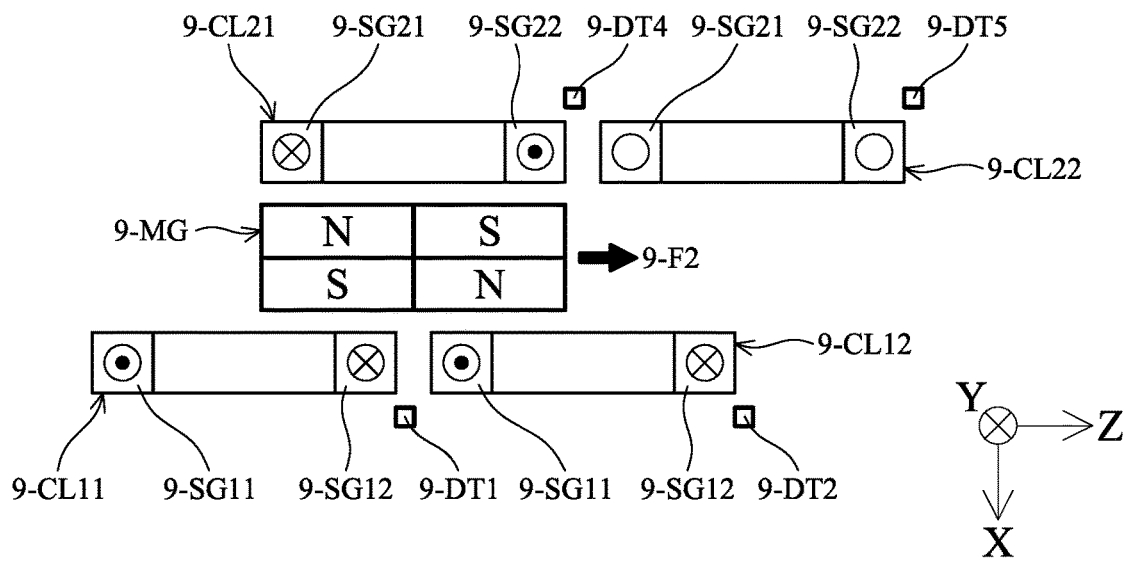
Figure 6C:
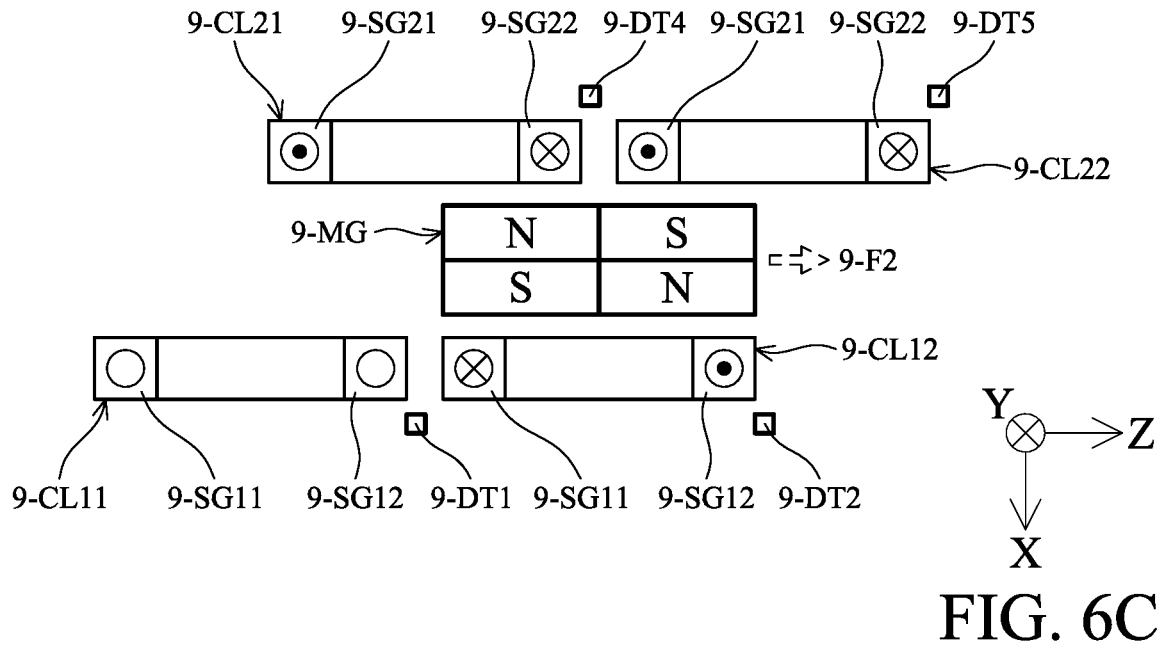

Similar to the driving assembly 9-120 of the previous embodiment, the control circuit 9-150 of this embodiment may control at least one first coil in the first coil group 9-121 and/or at least one second coil in the second coil group 9-122 according to the position information of the movable assembly 9-108 relative to the fixed assembly 9-101, and the movable assembly 9-108 connected to the magnetic element 9-MG, so that the first coil and/or the second coil act with the magnetic element 9-MG to generate an electromagnetic driving force 9-F2, thereby driving the movable assembly 9-108 to move in the first direction toward a target position (such as the position in FIG. 6C). In this embodiment, the optical element driving mechanism 9-100 may further include sensing elements 9-DT4, 9-DT5), which are disposed on a side of these second coils to obtain the position information of the magnetic element 9-MG.

Specifically, as shown in FIG. 6A, the magnetic element 9-MG is located in an initial position, and at this time, the control circuit 9-150 outputs the first control current (the positive current) to the first coil 9-CL11 to drive the magnetic element 9-MG to move in the first direction toward the target position (for example, the position in FIG. 6C). When viewed in the second direction, the first coil 9-CL11 completely overlaps the magnetic element 9-MG.

When the magnetic element 9-MG is located in the initial position, the second coil 9-CL21 generates a second induced current to the control circuit 9-150, and when viewed in the second direction, the first segment 9-SG21 of the second coil 9-CL21 overlaps the magnetic element 9-MG. Therefore, the control circuit 9-150 may output the second control current (the negative current) to the second coil 9-CL21 according to the second induced current so as to generate the electromagnetic driving force 9-F2.

When the magnetic element 9-MG moves from the initial position to the first position in FIG. 6B, the first segment 9-SG11 of the first coil 9-CL12 overlaps the magnetic element 9-MG, and the first coil 9-CL12 generates the first induced current to the control circuit 9-150. Therefore, the control circuit 9-150 can output the second control current to the first coil 9-CL12 according to the first induced current or the position information provided by the sensing elements 9-DT1, 9-DT4.

Furthermore, when the magnetic element 9-MG is located in the first position, the control circuit 9-150 switches the first control current provided to the first coil 9-CL11 to the second control current, so that the direction of the electromagnetic driving force 9-F2 generated by the magnetic element 9-MG and the first coil 9-CL11 remains unchanged. In other embodiments, when the magnetic element 9-MG is located in the first position in FIG. 6B, the control circuit 9-150 may stop supplying the first control current to the first coil 9-CL11. In addition, when the magnetic element 9-MG is located in the first position, the control circuit 9-150 may switch the second control current supplied to the second coil 9-CL21 to the first control current, so that the direction of the electromagnetic driving force 9-F2 generated by the magnetic element 9-MG and the second coil 9-CL21 remains unchanged.

Next, when the magnetic element 9-MG moves from the first position in FIG. 6B to the second position in FIG. 6C, the control circuit 9-150 switch the second control current supplied to the first coil 9-CL12 to the first control current. As shown in FIG. 6C, when the magnetic element 9-MG is located in the second position, the second segment 9-SG12 of the first coil 9-CL12 overlaps the magnetic element 9-MG.

In addition, when the magnetic element 9-MG moves to the second position in FIG. 6C, because the first coil 9-CL11 does not overlap the magnetic element 9-MG, the control circuit 9-150 stops outputting the second control current to the first coil 9-CL11.

Furthermore, when the magnetic element 9-MG moves to the second position, the first segment 9-SG21 of the second coil 9-CL22 overlaps the magnetic element 9-MG, and the control circuit 9-150 outputs the second control current to the second coil 9-CL22. In addition, when the magnetic element 9-MG is located in the second position, the control circuit 9-150 may stop supplying the first control current to the second coil 9-CL21 or switch the first control current provided to the second coil 9-CL21 to the second control current.

Figure 6D:
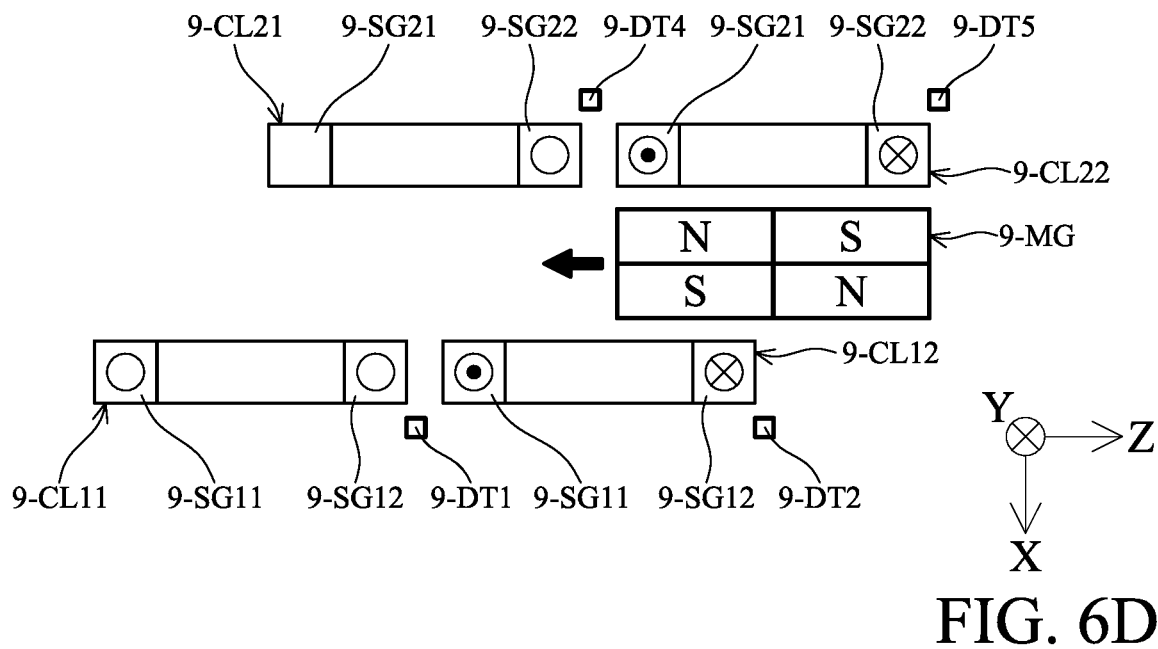

In some embodiments, when the magnetic element 9-MG moves from the initial position in the first direction but exceeds the target position in FIG. 6C and reaches, for example, the third position in FIG. 6D, the control circuit 9-150 can determine that the magnetic element 9-MG exceeds the target position according to the position information. At this time, the control circuit 9-150 outputs a reverse driving current to one of the first coils adjacent to the magnetic element 9-MG and/or one of the second coils adjacent to the magnetic element 9-MG to drive the magnetic element 9-MG to move in the third direction. For example, as shown in FIG. 6D, the control circuit 9-150 can provide the second control current to the second coil 9-CL22 and the first coil 9-CL12.

In addition, when the control circuit 9-150 determines that the magnetic element 9-MG is close to the target position in FIG. 6C according to the position information, the control circuit 9-150 may output the third control current to one of the first coils adjacent to the magnetic element 9-MG and/or one of the second coils adjacent to the magnetic element 9-MG, so that the magnetic element 9-MG maintains a stable state. In this embodiment, when the magnetic element 9-MG is adjacent to the first coil 9-CL12, the control circuit 9-150 outputs the third control current to the first coil 9-CL12.

Similar to the embodiment of FIG. 2, the control circuit 9-150 can output a correction current to the first coil group 9-121 and the second coil group 9-122 to drive the magnetic element 9-MG to return to the initial position. In addition, the control circuit 9-150 may control at least one first coil in the first coil group 9-121 and/or at least one second coil in the second coil group 9-122 according to the image data to drive the magnetic element 9-MG to move.

The present disclosure provides an optical element driving mechanism configured to drive the movable assembly 9-108 (for example, a camera lens) for performing the auto-focus function. In an embodiment of the present disclosure, the optical element driving mechanism 9-100 may include a first coil group 9-121, a second coil group 9-122, a magnetic element 9-MG, and a control circuit 9-150. The control circuit 9-150 can provide the positive current and/or the negative current to the coils in the first coil group 9-121 and the second coil group 9-122 according to the position information of the magnetic element 9-MG to generate the electromagnetic driving force to drive the magnetic element 9-MG to move. Because the coils in the first coil group 9-121 and the second coil group 9-122 are turned on in sequence according to the positive current or the negative current, it can ensure that the magnetic element 9-MG moves smoothly in the first direction, and the range of motion of the movable assembly 9-108 can be increased.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A control method of an optical element driving mechanism, comprising:
   providing a first coil group to a fixed assembly, wherein the first coil group includes a plurality of first coils;
   providing a magnetic element to be connected to a movable assembly; and
   controlling at least one first coil of the first coil group by a control circuit at least according to position information of the movable assembly relative to the fixed assembly, so that the at least one first coil acts with the magnetic element to generate an electromagnetic driving force, thereby driving the movable assembly to move relative to the fixed assembly in a first direction toward a target position,
   wherein the control circuit outputs a correction current to the first coil group to drive the magnetic element and the movable assembly to return to an initial position from the target position in a third direction, and the third direction is opposite to the first direction.

2. The control method of the optical element driving mechanism as claimed in claim 1, further comprising:
   when the magnetic element is located in the initial position, the control circuit outputs a first control current to a first one of the first coils so as to drive the magnetic element and the movable assembly to move in the first direction relative to the fixed assembly toward the target position, wherein when viewed in a second direction and the magnetic element is in the initial position, the first one of the first coils completely overlaps the magnetic element.

3. The control method of the optical element driving mechanism as claimed in claim 2, further comprising:
   when the magnetic element moves from the initial position to a first position, a second one of the first coils generates an induced current to the control circuit, wherein when viewed in the second direction, a first segment of the second one of the first coils overlaps the magnetic element; and
   the control circuit outputs a second control current to the second one of the first coils according to the induced current, wherein a phase difference between the first control current and the second control current is 180 degrees.

4. The control method of the optical element driving mechanism as claimed in claim 3, further comprising:
   when the magnetic element is located in the first position, the control circuit stops supplying the first control current to the first one of the first coils or switches the first control current provided to the first one of the first coils to the second control current.

5. The control method of the optical element driving mechanism as claimed in claim 4, further comprising:
   when the magnetic element moves from the first position to a second position, the control circuit switches the second control current supplied to the second one of the first coils to the first control current, wherein when the magnetic element is located in the second position, a second segment of the second one of the first coils overlaps the magnetic element.

6. The control method of the optical element driving mechanism as claimed in claim 5, further comprising:

when the magnetic element moves from the first position to the second position, the control circuit stops outputting the second control current to the first one of the first coils.

7. The control method of the optical element driving mechanism as claimed in claim 1, further comprising:
when the control circuit determines that the magnetic element exceeds the target position in the first direction according to the position information, the control circuit outputs a reverse driving current to one of the first coils which is adjacent to the magnetic element so as to drive the magnetic element to move in the third direction.

8. The control method of the optical element driving mechanism as claimed in claim 1, further comprising:
when the control circuit determines that the magnetic element is close to the target position according to the position information, the control circuit outputs a third control current to one of the first coils adjacent to the magnetic element, so that the magnetic element maintains a stable state.

9. The control method of the optical element driving mechanism as claimed in claim 1, further comprising:
the control circuit controls at least one first coil in the first coil group according to image data.

10. A control method of an optical element driving mechanism, comprising:
providing a first coil group to a fixed assembly, wherein the first coil group includes a plurality of first coils;
providing a second coil group to the fixed assembly, wherein the second coil group includes a plurality of second coils;
providing a magnetic element to a movable assembly; and
controlling at least one first coil of the first coil group and/or at least one second coil of the second coil group by a control circuit at least according to position information of the movable assembly relative to the fixed assembly, so that the at least one first coil and/or the at least one second coil acts with the magnetic element to generate an electromagnetic driving force, thereby driving the movable assembly to move relative to the fixed assembly in a first direction toward a target position;
wherein the control circuit outputs a correction current to the first coil group and the second coil group to drive the magnetic element and the movable assembly to return to an initial position from the target position in a third direction, and the third direction is opposite to the first direction.

11. The control method of the optical element driving mechanism as claimed in claim 10, further comprising:
when the magnetic element is located in the initial position, the control circuit outputs a first control current to a first one of the first coils to drive the magnetic element and the movable assembly to move relative to the fixed assembly in the first direction toward the target position, wherein when viewed in a second direction, the first one of the first coils completely overlaps the magnetic element.

12. The control method of the optical element driving mechanism as claimed in claim 11, further comprising:
when the magnetic element is located in the initial position, a first one of the second coils generates a second induced current to the control circuit, wherein when viewed in the second direction, a first segment of the first one of the second coils overlaps the magnetic element; and the control circuit outputs a second control current to the first one of the second coils according to the second induced current, wherein a phase difference between the first control current and the second control current is 180 degrees.

13. The control method of the optical element driving mechanism as claimed in claim 12, further comprising:
when the magnetic element moves from the initial position to a first position, a second one of the first coils generates a first induced current to the control circuit, and a first segment of the second one of the first coils overlaps the magnetic element; and
the control circuit outputs the second control current to the second one of the first coils according to the first induced current.

14. The control method of the optical element driving mechanism as claimed in claim 13, further comprising:
when the magnetic element is located in the first position, the control circuit stops supplying the first control current to the first one of the first coils or switches the first control current provided to the first one of the first coils to the second control current.

15. The control method of the optical element driving mechanism as claimed in claim 14, further comprising:
when the magnetic element is located in the first position, the control circuit switches the second control current provided to the first one of the second coils to the first control current.

16. The control method of the optical element driving mechanism as claimed in claim 15, further comprising:
when the magnetic element moves from the first position to a second position, the control circuit switches the second control current supplied to the second one of the first coils to the first control current, wherein when the magnetic element is located in the second position, a second segment of the second one of the first coils overlaps the magnetic element.

17. The control method of the optical element driving mechanism as claimed in claim 15, further comprising:
when the magnetic element moves from the first position to the second position, the control circuit stops outputting the second control current to the first one of the first coils.

18. The control method of the optical element driving mechanism as claimed in claim 15, further comprising:
when the magnetic element moves from the first position to the second position, the control circuit outputs the second control current to a second one of the second coils, wherein when the magnetic element is located in the second position, a first segment of the second one of the second coils overlaps the magnetic element.

19. The control method of the optical element driving mechanism as claimed in claim 15, further comprising:
when the magnetic element moves from the first position to the second position, the control circuit stops supplying the first control current to the first one of the second coils or switches the first control current provided to the first one of the second coils to the second control current.

20. The control method of the optical element driving mechanism as claimed in claim 10, further comprising:
when the control circuit determines that the magnetic element exceeds the target position in the first direction according to the position information, the control circuit outputs a reverse driving current to one of the first coils that is adjacent to the magnetic element and/or one of the second coils which is that is adjacent to the magnetic element so as to drive the magnetic element to move in the third direction.

21. The control method of the optical element driving mechanism as claimed in claim 10, further comprising:

when the control circuit determines that the magnetic element is close to the target position according to the position information, the control circuit outputs a third control current to one of the first coils adjacent to the magnetic element and/or one of the second coils adjacent to the magnetic element, so that the magnetic element maintains a stable state.

22. An optical element driving mechanism, comprising:

a fixed assembly;

a movable assembly, movable relative to the fixed assembly;

a driving assembly, configured to drive the movable assembly to move relative to the fixed assembly, wherein the driving assembly comprises:

a first coil group, having a plurality of first coils, wherein each of the first coils includes a first segment and a second segment which are parallel to each other and are perpendicular to a first direction; and a magnetic element, connected to the movable assembly; and a control circuit, electrically connected to the first coils;

wherein a maximum size of the magnetic element is greater than or equal to a shortest distance between the first segment and the second segment in the first direction;

wherein the control circuit controls the first coil group to drive the magnetic element and the movable assembly to move in the first direction to a target position and move in a third direction back to an initial position, and the third direction is opposite to the first direction.

* * * * *